(12) United States Patent
Wei et al.

(10) Patent No.: US 11,753,311 B2
(45) Date of Patent: Sep. 12, 2023

(54) HOUSEHOLD WATER PURIFIER AND FILTER QUICK KNOCKDOWN MECHANISM THEREOF

(71) Applicant: TIANJIN YUNDA INDUSTRY AND TRADE CO., LTD, Tianjin (CN)

(72) Inventors: Enyu Wei, Tianjin (CN); Hao Xu, Tianjin (CN); Yinping Yuan, Tianjin (CN)

(73) Assignee: TIANJIN YUNDA INDUSTRY AND TRADE CO., LTD, Tianjin (CN)

( * ) Notice: Subject to any disclaimer, the term of this patent is extended or adjusted under 35 U.S.C. 154(b) by 167 days.

(21) Appl. No.: 17/360,796

(22) Filed: Jun. 28, 2021

(65) Prior Publication Data

US 2022/0340447 A1     Oct. 27, 2022

(30) Foreign Application Priority Data

Apr. 21, 2021    (CN) .......................... 202120820492.4

(51) Int. Cl.
     *C02F 1/00*          (2023.01)

(52) U.S. Cl.
     CPC ........ *C02F 1/003* (2013.01); *C02F 2201/004* (2013.01); *C02F 2209/003* (2013.01); *C02F 2307/06* (2013.01)

(58) Field of Classification Search
     CPC ............ B01D 35/306; B01D 2201/305; B01D 2201/4007; B01D 2201/4046; B01D 2201/4053; B01D 2201/4061; C02F 2201/004; C02F 2201/006; C02F 2209/003

See application file for complete search history.

(56) References Cited

U.S. PATENT DOCUMENTS

| | | | |
|---|---|---|---|
| 9,868,081 B1* | 1/2018 | Zhang .................... | B01D 29/96 |
| 2003/0024860 A1* | 2/2003 | Fritze .................... | F25D 23/126 |
| | | | 210/97 |
| 2015/0274544 A1* | 10/2015 | Ben-David ............ | B01D 29/96 |
| | | | 210/232 |
| 2016/0263504 A1* | 9/2016 | Lin ........................ | C02F 1/003 |
| 2018/0265376 A1* | 9/2018 | Kim ........................ | C02F 1/02 |

FOREIGN PATENT DOCUMENTS

CN          109621534     *   4/2019

* cited by examiner

*Primary Examiner* — Benjamin M Kurtz
(74) *Attorney, Agent, or Firm* — Tutunjian & Bitetto, P.C.

(57) ABSTRACT

A household water purifier and a filter quick knockdown mechanism thereof are provided. The water purifier includes the filter quick knockdown mechanism, and a housing. The filter included in the filter quick knockdown mechanism and the housing are connected via the filter quick knockdown mechanism. A lower end surface of the filter is movably connected with a pressing plate, and the pressing plate is configured to lift the filter and press the pressing lid of the filter quick knockdown mechanism upon disassembling the filter. The filter quick knockdown mechanism includes a first positioning mechanism and a locking mechanism. When the first positioning mechanism provided on the filter is configured to be mated with a second positioning mechanism provided on the housing, the filter is coupled with the housing via the locking mechanism.

9 Claims, 7 Drawing Sheets

HOUSEHOLD WATER PURIFIER AND FILTER QUICK KNOCKDOWN MECHANISM THEREOF

CROSS REFERENCE TO RELATED APPLICATION

This patent application claims the benefit and priority of Chinese Patent Application No. 202120820492.4 filed on Apr. 21, 2021, the disclosure of which is incorporated by reference herein in its entirety as part of the present application.

TECHNICAL FIELD

The disclosure relates to the field of water purifier technologies, in particular to a household water purifier and a filter quick knockdown mechanism thereof.

BACKGROUND ART

At present, a quick installation method of a filter on the market is commonly rotary fixation, and the installation and fixation of the filter can be achieved by screwing the filter to a certain angle and snapping the filter into a specific position. However, due to a cylindrical shape of the filter, users cannot find a correct position where the filter is snapped into a machine. As a result, first the filter needs to be rotated many times to find the correct position, and then to rotate and snap the filter into fixed holes of the machine. Thus, this installation process is cumbersome. In addition, when a service life of a filter of a water purifier is up, and the filter needs to be removed, a large amount of water remains inside the filter. During the removal process, the water inside the filter will flow out, causing a large amount of water to remain at the water purifier, cabinets, and the ground, which is difficult to deal with. Further, the water flowing out from the water purifier will cause damages to the water purifier, cabinets or other furniture and appliances, the filter is not friendly for replacement and usage. Therefore, further improvement is urgently needed.

SUMMARY

A purpose of the present disclosure is to provide a household water purifier and a filter knockdown mechanism thereof, so as to solve the problem of inconveniently disassembling and assembling a filter in the prior art, and to facilitate disassembling and assembling as well as positioning of the filter.

In order to achieve the above purpose, the disclosure provides the following solutions.

A filter quick knockdown mechanism, including a first positioning mechanism and a locking mechanism, wherein the first positioning mechanism provided on a filter is configured to be mated with a second positioning mechanism provided on a housing, when the first positioning mechanism and the second positioning mechanism are mated with each other, the filter is coupled with the housing via the locking mechanism.

Preferably, the locking mechanism includes snapping blocks and a translation rod, the translation rod is configured to be slidably arranged on the housing, an upper end of the filter is provided with a connection boss for connecting a water flow pipeline, and the translation rod and the connection boss each are provided with the snapping blocks at equal intervals, when the connection boss is abutted against a bottom surface of an inner cavity of the housing, ones of the snapping blocks which are arranged on the translation rod are coupled with ones of the snapping blocks which are arranged on the connection boss, so as to lock the filter.

Preferably, the connection boss includes two symmetrical side surfaces, the translation rod is a Y-shaped translating fork, two branches of the Y-shaped translating fork are symmetrically arranged at the two side surfaces of the connection boss, the two branches of the Y-shaped translating fork each are connected with a first spring, a handle portion of the Y-shaped translating fork is connected with a linkage mechanism which is provided at top thereof with a recess with a gradually changing depth, and the handle portion of the Y-shaped translating fork is abutted against the recess, such that the Y-shaped translating fork is moved inward as the linkage mechanism is moved upward.

Preferably, the linkage mechanism includes a first link and a second link, a second spring is provided between the first link and the second link, a lower end of the second link is provided with a pressing lid for pressing, and an upper end of the first link is provided with the recess.

Preferably, the snapping blocks includes fixed blocks and movable blocks, the fixed blocks and the movable blocks are wedge-shaped blocks with a same width, upper surfaces of the fixed blocks and lower surfaces of the movable blocks are beveled surfaces, inclination angles of the beveled surfaces are not less than an inclination angle of a lower sloping surface of the recess, a displacement of the Y-shaped translation fork laterally moved by a push from the linkage mechanism is at least a width of one of the wedge-shaped blocks; when the first spring returns to an original position, a lower surface of each of the fixed blocks is abutted with an upper surface of corresponding one of the movable blocks.

Preferably, the first positioning mechanism includes a guide groove and the second positioning mechanism is provided with the positioning protrusion mated with the guide groove, and the guide groove and the positioning protrusion are both parallel to an axis of the filter; or the first positioning mechanism includes a positioning protrusion and the second positioning mechanism is provided with a guide groove mated with the positioning protrusion, the guide groove and the positioning protrusion are both parallel to an axis of the filter.

A household water purifier is provided by the disclosure, which includes the above filter quick knockdown mechanism. A lower end surface of the filter is movably connected with a pressing plate, and the pressing plate is configured to lift the filter and press the pressing lid of the filter quick knockdown mechanism upon disassembling the filter.

Preferably, the lower end surface of the filter is provided with a U-shaped groove along a radial direction, a pair of sliding grooves is symmetrically provided at two sides of the U-shaped groove, a pair of cylindrical sliding blocks matching with the sliding grooves is symmetrically provided at two sides of a middle portion of the pressing plate, such that the pressing lid is flush with the lower end surface of the filter.

Preferably, the connection boss of the filter is provided with a water inlet and a water outlet with a same shape, the water inlet and the water outlet are provided therein with a water-stop mechanism respectively, the water-stop mechanism is hermetically connected with a shell of the filter and the water flow pipeline; and a water outlet of the water flow pipeline is connected to a water quality monitor provided on a water faucet.

Preferably, the water-stop mechanism includes an elastic element and a rebound water-stop valve, the rebound water-stop valve includes a water-inlet valve plate, a water-stop valve plate and a support rod, shapes of both the water-inlet valve plate and the water-stop valve plate are matched with a shape of the water inlet or a shape of the water outlet, the water-inlet valve plate is provided with a plurality of water passage holes, a bottom portion of the water inlet or a bottom portion of the water outlet is provided with an annular boss surface of which a center is provided with a water-inlet through hole, an upper end of the support rod is connected with a center portion of the water-inlet valve plate, a lower end of the support rod is connected with a center portion of the water-stop valve plate, the elastic element is a spring that is sleeved on the support rod and located between the water-inlet valve plate and the annular boss surface, a diameter of the water-inlet through hole is greater than a diameter of the support rod and less than a diameter of the water-stop valve plate, the water-stop valve plate is located below the annular boss surface, an upper end of the water inlet or an upper end of the water outlet as well as an upper surface of the water-stop valve plate are provided with sealing rings, the diameter of the water-stop valve plate is greater than an inner diameter of each of the sealing rings on the water inlet or the water outlet, and less than an inner diameter of the water inlet or an inner diameter of the water outlet.

Compared with the prior art, the disclosure has the following technical effects.

The filter quick knockdown mechanism in the disclosure is convenient for assembling and disassembling the filter, which can realize a one-key assembling and disassembling. The household water purifier also makes an inner structure of the filter to have a function of automatically stopping water through a water-stop mechanism, thereby avoiding a case where water flows out from the filter to pollute the ground and even damage furniture and appliances, which greatly improves user experience. And the household water purifier is equipped with a water quality monitor, so as to monitor the water quality in real time, which is convenient for monitoring and replacing the filter.

BRIEF DESCRIPTION OF THE DRAWINGS

In order to explain the embodiments of the present disclosure or the technical solutions in the prior art more clearly, the drawings needed in the embodiments will be briefly introduced herein below. Obviously, the drawings in the following description are only a part of the drawings of the present disclosure. For those of ordinary skill in the art, other drawings can be obtained based on these drawings without creative work.

List of reference numbers: 1—household water purifier, 100—filter quick knockdown mechanism, 110—housing; 111—second link; 112—spring; 113—first link; 114—fixing block; 115—movable block; 116—pressing lid; 117—positioning protrusion; 118—guide groove; 120—filter; 121—pressing plate; 211—U-shaped groove; 212—sliding groove; 213—slider; 122—Y-shaped translating fork; 123—sealing ring; 124—water-inlet valve plate; 125—water-stop valve plate; 126—support rod; 127—water flow pipeline; 128—recess; 129—connection boss; 130—water quality monitor.

DETAILED DESCRIPTION OF THE EMBODIMENTS

The technical solutions in the embodiments of the present disclosure will be clearly and completely described below with reference to the drawings in the embodiments of the present disclosure. It is apparent that the described embodiments are only a part of the embodiments of the present disclosure, rather than all of the embodiments. Based on the embodiments of the present disclosure, all other embodiments obtained by those skilled in the art without inventive efforts would fall within the protection scope of protection of the present disclosure.

The purpose of the disclosure is to provide a household water purifier and a filter quick knockdown mechanism, so as to solve the problems existing in the prior art and facilitate to disassemble and assemble, as well as to position the filter.

In order to make the above objectives, features and advantages of the present disclosure more obvious and easy to understand, the present disclosure will be further described in detail below with reference to the accompanying drawings and specific embodiments.

Example 1

Figure 4:
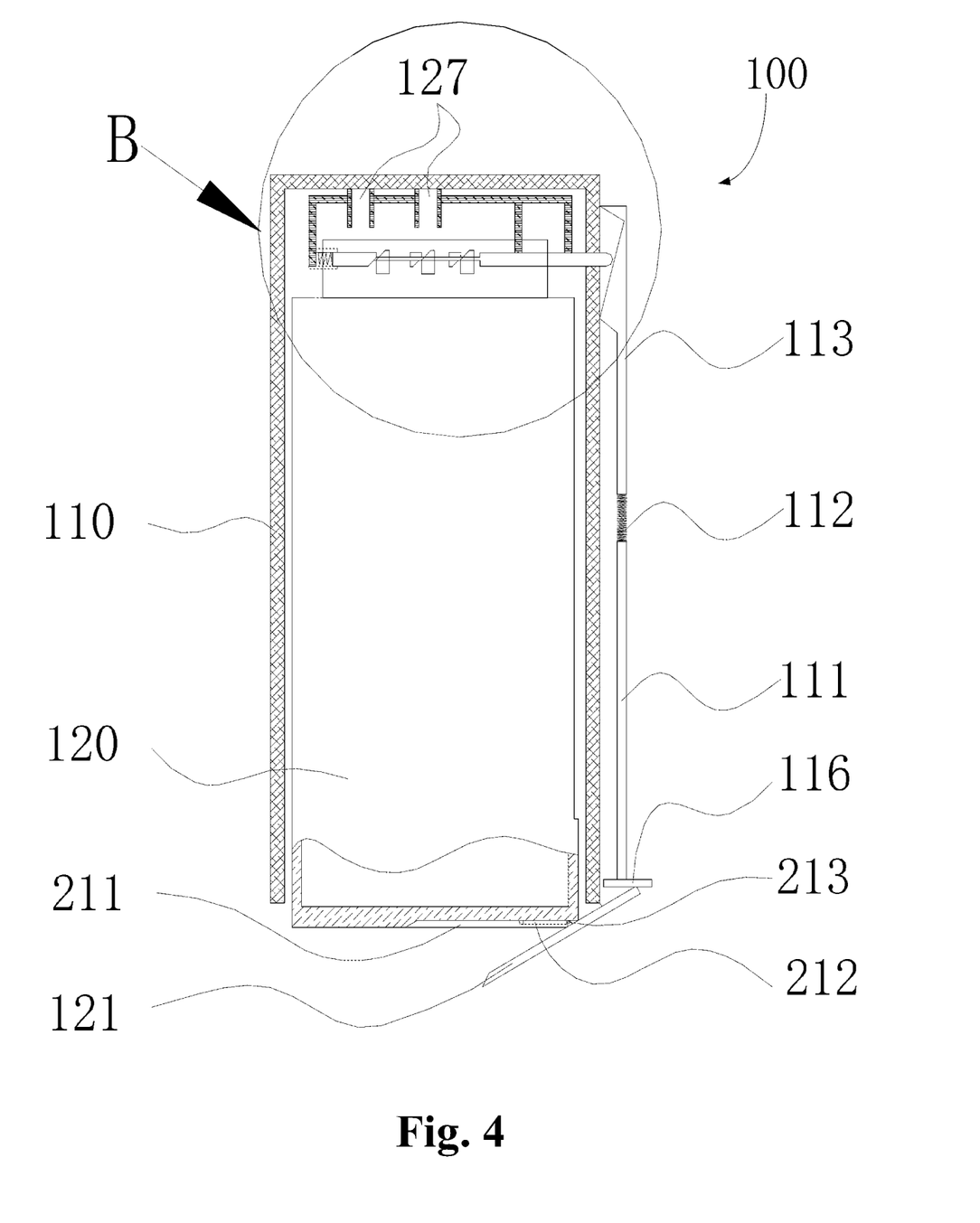
FIG. 4 is a schematic structural diagram of a filter quick knockdown mechanism according to embodiments of the disclosure.
Figure 5:
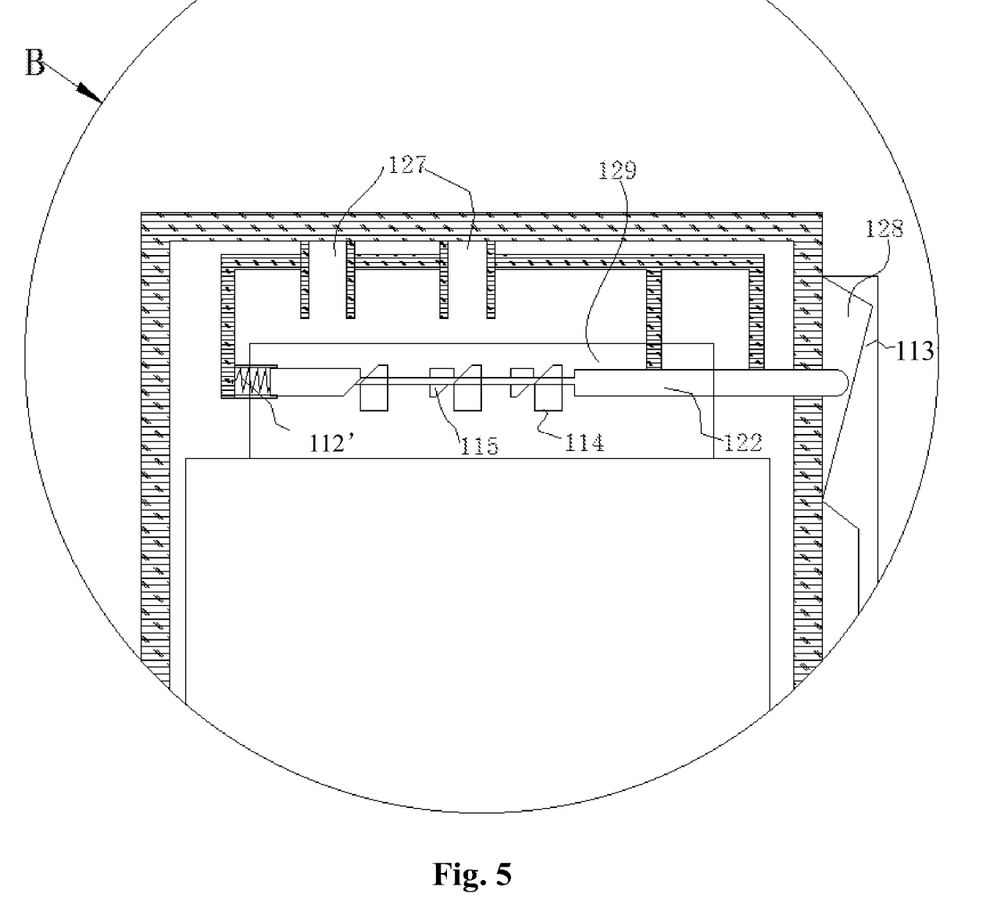
FIG. 5 is a schematic structural view of a part B in FIG. 4 according to embodiments of the present disclosure.
Figure 6:
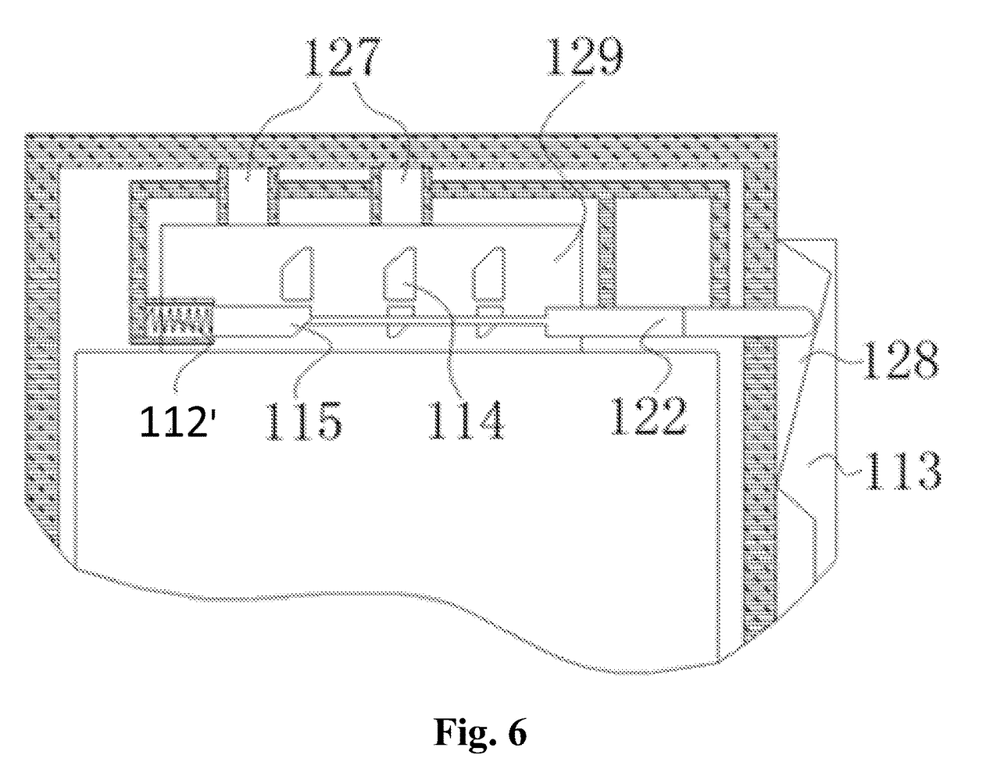
FIG. 6 is a schematic structural diagram of a locking mechanism of the filter quick knockdown mechanism according to embodiments of the disclosure.

As shown in FIGS. 4-6, in the embodiment, there provides a filter quick knockdown mechanism 100, which includes a first positioning mechanism and a locking mechanism. The positioning mechanisms (i.e., the first positioning mechanism and a second positioning mechanism) provided on both the filter 120 and the housing 110 are matched each other. When the first positioning mechanism and the second positioning mechanism are matched, the filter 120 is coupled with the housing 110 by the locking mechanism. The locking mechanism includes a snapping block and a translation rod. The translation rod is slidably arranged on the housing 110. An upper end of the filter 120 is provided with a connection boss 129 for connecting a water flow pipeline 127. The translation rod and the connection boss 129 each are provided with a plurality of snapping blocks at equal intervals. When the connection boss 129 is abutted against a bottom surface of an inner cavity of the housing 110, the snapping blocks of the translation rod can be coupled with the snapping blocks of the connection boss 129, so that the filter 120 is locked.

The connection boss 129 includes two symmetrical side surfaces, and a cross section of the connection boss may be a shape with a waist-shaped hole, or other shapes with two symmetrical side surfaces. The translation rod is a Y-shaped translating fork 122, of which two branches and a handle portion are an integral part. The two branches of the Y-shaped translating fork 122 are symmetrically arranged at two side surfaces of the connection boss 129. The two branches of the Y-shaped translating fork 122 are respectively connected with a spring 112' (also referred to as a first spring), and the handle portion is connected with a linkage mechanism. A top portion of the linkage mechanism is provided with a recess 128 with a gradient depth. When the linkage mechanism moves upward, the Y-shaped translating fork 122 moves inward. A cross-section of the recess 128 may be triangular, arc-shaped or other special shapes with a smoothly transitional depth, which is convenient for a link to convert a vertical movement into a horizontal translation. The handle portion of the Y-shaped translating fork 122 is abutted against a lower sloping surface (i.e., a plane where a long side of an oblique triangle is located) of a recess 128. The linkage mechanism includes a first link 113 and a second link 111. The spring 112 (also referred to as a second spring) is provided between the first link 113 and the second link 111. After pressing a pressing lid 116, the second link 111 may be ejected to be flush with a surface of the housing. A lower end of the second link 111 is provided with the pressing lid 116 for pressing. An upper end of the first link 113 is provided with the recess 128. And an inclination angle of the lower sloping surface is in a range of 25°-30°. The snapping block includes a fixed block 114 and a movable block 115. The fixed block 114 and the movable block 115 are wedge-shaped blocks with the same width. An upper surface of the fixed block 114 and a lower surface of the movable block 115 are both beveled surfaces, and each of the beveled surfaces has an inclination angle not less than the inclination angle of the lower sloping surface. A displacement of the Y-shaped translation fork 122 laterally moved by squeezing is at least a width of one of the wedge-shaped blocks, and a distance between adjacent two wedge-shaped blocks is at least the width of one of the wedge-shaped blocks, so that the wedge-shaped block on the branch of the Y-shaped translation fork 122 can pass through when the filter 120 is inserted. When the spring 112 is reset, a lower surface of the fixed block 114 and an upper surface of the movable block 115 are abutted. And when the filter 120 is inserted, the beveled surfaces of both the fixed block 114 and the movable block 115 are abutted, and the beveled surface of the fixed block 114 pushes the movable block 115 to move along the beveled surface of the movable block 115, in a process of squeezing the Y-shaped translation fork 122 to move laterally. When the filter 120 is withdrawn, the pressing lid 116 is pressed, the Y-shaped translating fork 122 is moved horizontally inward via squeezing of the lower sloping surface of the first link 113, so as to squeeze the spring 112 and stagger the lower surface of the fixed block 114 and the upper surface of the movable block 115, so that the movable block 115 is moved along a side surface and the beveled surface of the fixed block 114.

Figure 7:
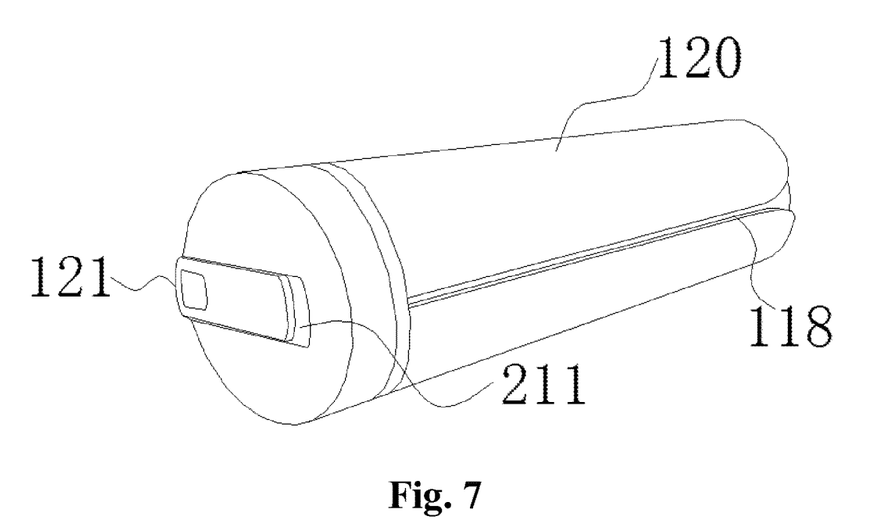
FIG. 7 is a schematic structural diagram of an external structure of a filter according to embodiments of the disclosure.
Figure 8:
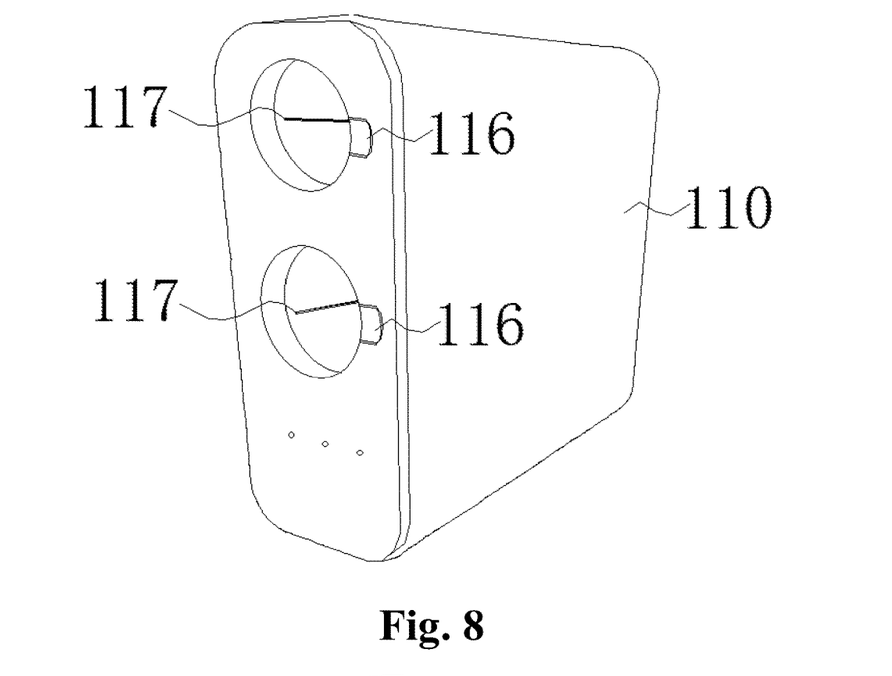
FIG. 8 is a schematic structural view of a housing according to embodiments of the disclosure.
Figure 9:
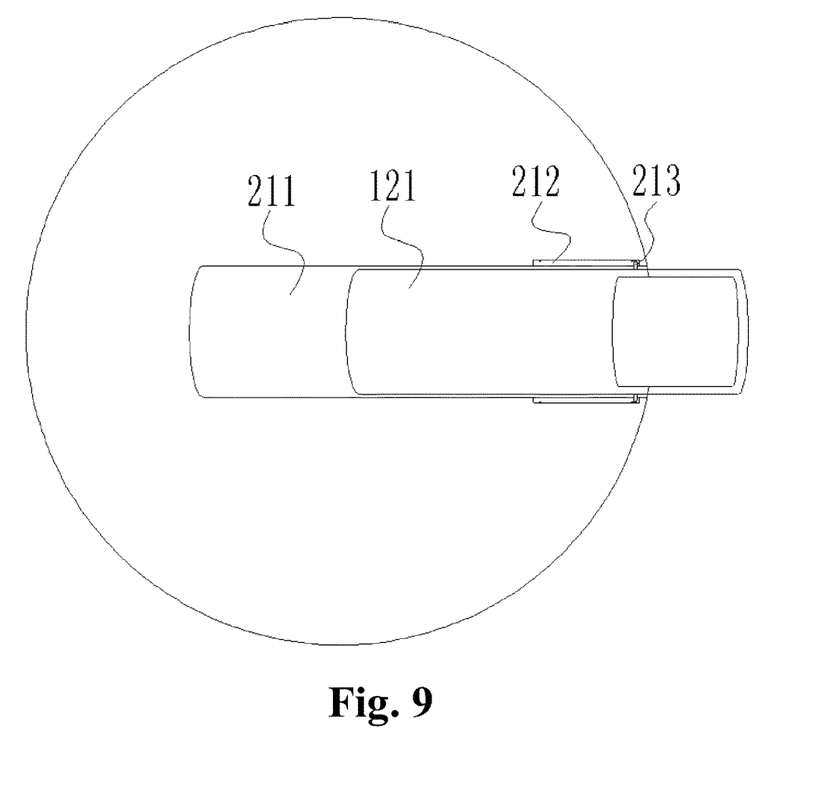
FIG. 9 is a schematic structural view of a connection configuration of a pressing plate in the filter according to embodiments of the disclosure.

The first positioning mechanism includes a guide groove 118, and the second positioning mechanism includes a positioning protrusion 117. The filter 120 is provided with the guide groove 118, the housing 110 is provided with the positioning protrusion 117 matching with the guide groove 118. Optionally, the housing 110 is also provided with the guide groove (not shown), and the filter 120 is also provided with the positioning protrusion (not shown) matching with the guide groove. The guide groove 118 and the positioning protrusion 117 are both parallel to an axis of the filter 120. After the guide groove 118 and the positioning protrusion 117 in this embodiment are aligned and matched, a coplanar matching of the fixed block 114 and the movable block 115 is realized.

Example 2

As shown in FIGS. 1-11, this embodiment also discloses a household water purifier 1 including the filter quick knockdown mechanism 100, the housing 110 and at least two filters 120 in the first embodiment. The filter 120 and the housing 110 are connected by the filter quick knockdown mechanism 100. A lower end surface of the filter 120 is movably connected with a pressing plate 121. The pressing plate 121 is configured to lift the filter 120 and press the pressing lid 116 of the filter quick knockdown mechanism 100 when disassembling the filter 120. The filter 120 may be a filter element made of various materials such as reverse osmosis membrane, ultrafiltration membrane, activated carbon, ceramics, etc. A U-shaped groove 211 is provided on the lower end surface of the filter 120 in a radial direction to facilitate the pressing plate 121 to slide a certain distance, so as to press the pressing lid 116. A pair of waist-shaped sliding grooves 212 is symmetrically provided at both sides of the U-shaped groove 211. The sliding grooves 212 are preferably arranged at one end close to an opening of the U-shaped groove, so as to facilitate the pressing of the pressing plate 121. A pair of cylindrical sliding blocks 213 is symmetrically arranged at both sides of a middle portion of the pressing plate 121, which can realize a rotation of the pressing plate 121 in the sliding grooves 212 to press the pressing lid 116 and match the sliding block 213 and the sliding groove 212. Two ends of each of the sliding grooves 212 are also provided with a convex point respectively, so that the sliding block 213 can be stably rotated at the two ends of the sliding groove 212, and the pressing lid 116 can be kept flush with the lower end surface of the filter 120. The connection boss 129 of the filter 120 is provided with a water inlet and a water outlet with a same shape. The water inlet and the water outlet are both provided with a water-stop mechanism therein. The water-stop mechanism is hermetically connected with a shell of the filter 120 and the water flow pipeline 127. The water flow pipeline 127 includes a water-inlet pipe and a water-outlet pipe. And a water outlet of the water-outlet pipe is connected to a water quality monitor 130 provided on a water faucet, so as to facilitate the real-time monitoring of the water quality and replacement of the filter.

Figure 1:
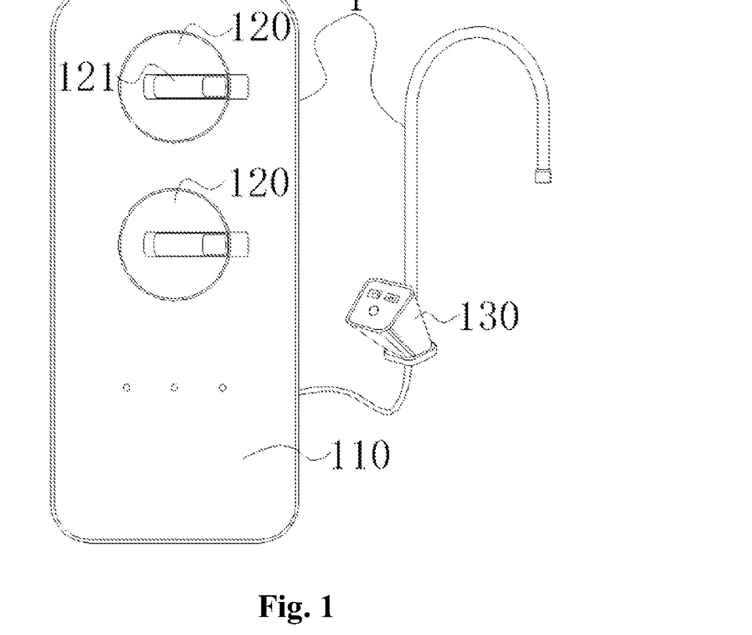
FIG. 1 is a schematic structural diagram of a household water purifier according to embodiments of the disclosure.
Figure 2:
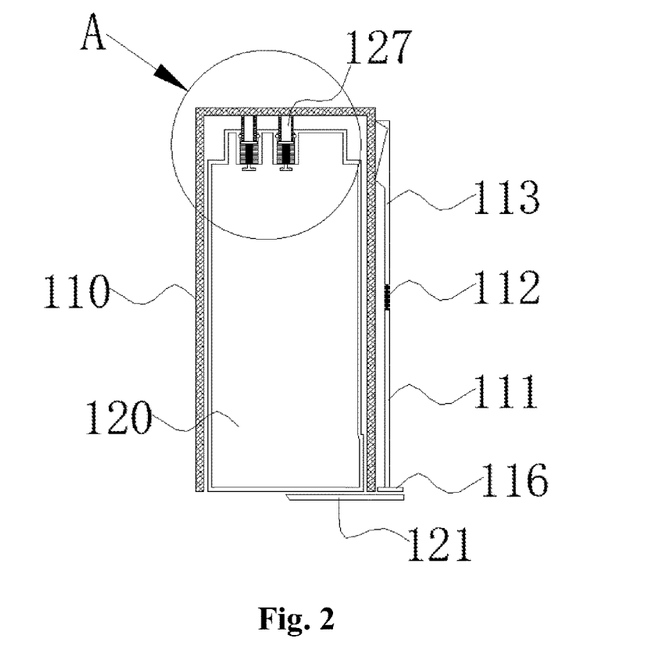
FIG. 2 is a schematic structural view of a water-stop mechanism according to embodiments of the disclosure.
Figure 3:
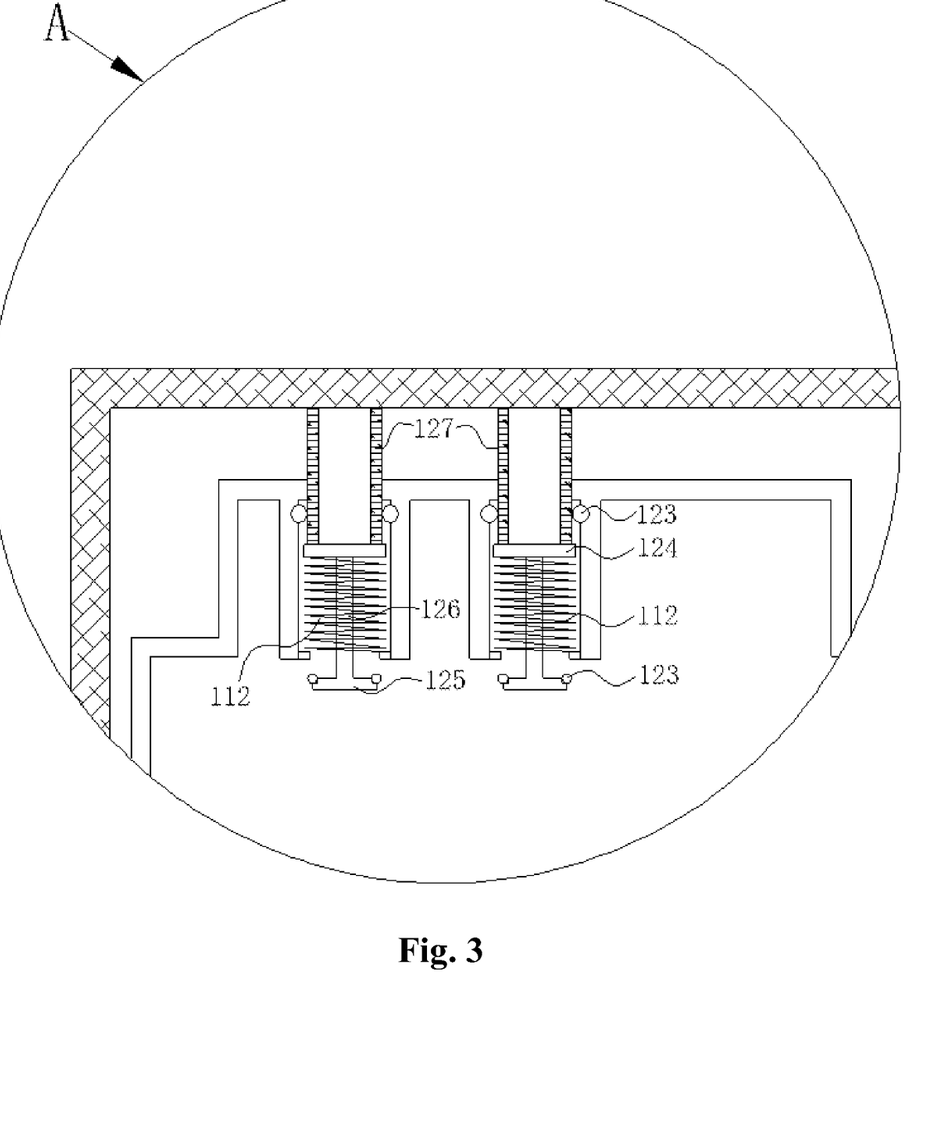
FIG. 3 is a schematic structural view of a part A in FIG. 2 according to embodiments of the present disclosure.
Figure 10:
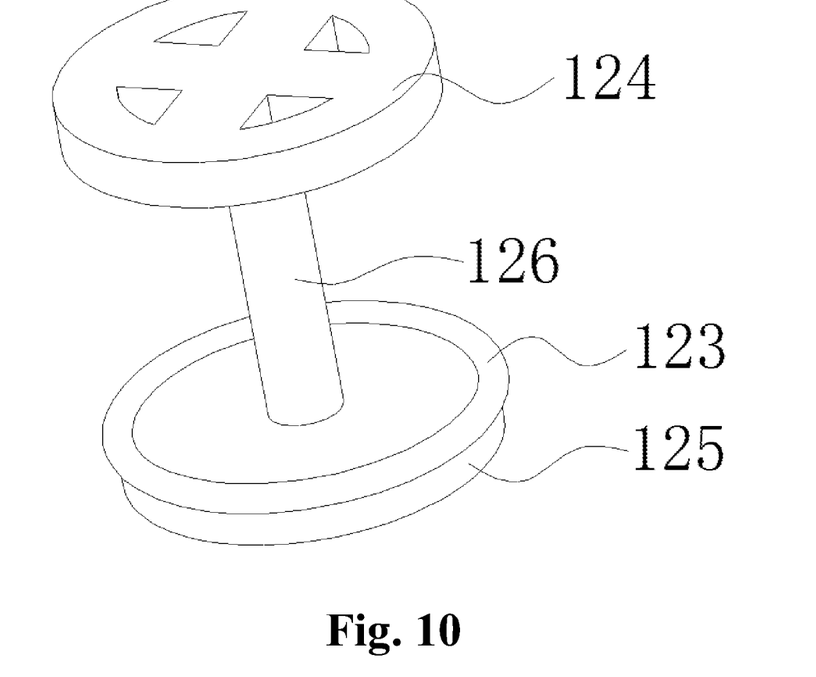
FIG. 10 is a schematic structural diagram of a rebound water-stop valve according to embodiments of the disclosure.
Figure 11:
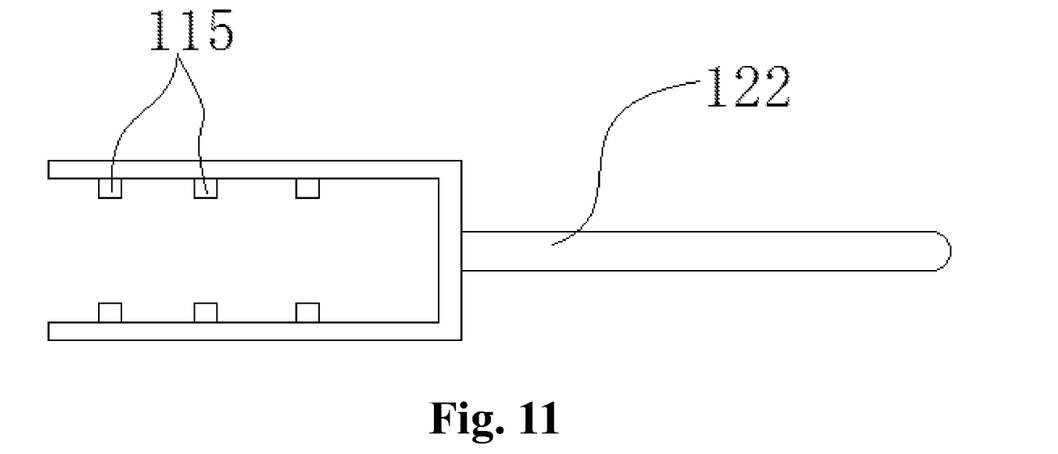
FIG. 11 is a schematic structural diagram of a Y-shaped translating fork according to embodiments of the disclosure.

The water-stop mechanism includes an elastic element and a rebound water-stop valve. The rebound water-stop valve includes a water-inlet valve plate 124, a water-stop valve plate 125 and a support rod 126, shapes of both the water-inlet valve plate 124 and the water-stop valve plate 125 are matched with a shape of the water inlet or a shape of the water outlet of the connection boss 129. And the water-inlet valve plate 124 is provided with a plurality of water passage holes. A bottom portion of the water inlet or the water outlet of the connection boss 129 is provided with an annular boss surface. A center of the annular boss surface is provided with a water-inlet through hole. An upper end of the support rod 126 is connected with a center portion of the water-inlet valve plate 124, and a lower end of the support rod 126 is connected with a center portion of the water-stop valve plate 125. The elastic element is a spring 112 that is sleeved on the support rod 126 and located between the water-inlet valve plate 124 and the annular boss surface. A diameter of the water-inlet through hole is greater than a diameter of the support rod 126 and less than a diameter of the water-stop valve plate 125, so as to facilitate a squeezed seal between the water-stop valve plate 125 and the annular boss surface under a restoring force of the spring 112 to prevent the water in the filter from flowing out, which plays a water-stop function. The water-stop valve plate 125 is located beneath the annular boss surface, and an upper end of the water inlet or an upper end of the water outlet of the connection boss 129, as well as an upper surface of the water-stop valve plate 125 are provided with sealing rings 123. The diameter of the water-stop valve plate 125 is greater than an inner diameter of the sealing ring 123 on the water inlet or the water outlet and a diameter of the water-inlet through hole, and less than an inner diameter of the water inlet or an inner diameter of the water outlet. In this way, the water-stop valve plate is not slided out the water inlet or the water outlet by the limiting of the sealing ring 123. When the water-inlet pipe or water-outlet pipe presses the water-inlet valve plate 124, the water-stop valve plate 125 moves down along with the support rod 126, thereby generating a gap between the water-stop valve plate and the annular boss surface, opening the water-inlet through hole, and realizing a flow of water.

The filter quick knockdown mechanism 100 in the disclosure is convenient for assembling and disassembling the filter, which can realize a one-key assembling and disassembling. The household water purifier 1 also makes an inner structure of the filter to have the function of automatically stopping water through the water-stop mechanism, thereby avoiding a case where water flows out from the filter to pollute the ground and even damage furniture and appliances, which greatly improves the user experience. And the household water purifier is equipped with the water quality monitor 130, so as to monitor the water quality in real time, which is convenient for monitoring and replacing the filter.

The principle and the implementation mode of the present disclosure are explained by using specific examples in the present specification, and the above description of the embodiments is only used to help understand the method and the core idea of the present disclosure; meanwhile, for a person skilled in the art, it may be changed in the specific embodiments and the application range according to the idea of the present disclosure. In conclusion, the contents of the description should not be construed as limitations on the disclosure.

What is claimed is:

1. A household water purifier, comprising:
   a filter;
   a housing; and
   a filter quick knockdown mechanism, comprising a first positioning mechanism, a second positioning mechanism and a locking mechanism, wherein the first positioning mechanism provided on the filter is configured to be mated with the second positioning mechanism provided on the housing, when the first positioning mechanism and the second positioning mechanism are mated with each other, the filter is coupled with the housing via the locking mechanism;
   wherein the locking mechanism comprises snapping blocks and a translation rod, the translation rod is configured to be slidably arranged on the housing, an upper end of the filter is provided with a connection boss for connecting a water flow pipeline, and the translation rod and the connection boss each are provided with the snapping blocks at equal intervals, when the connection boss is abutted against a bottom surface of an inner cavity of the housing, at least one of the snapping blocks which are arranged on the translation rod is coupled with at least one of the snapping blocks which are arranged on the connection boss, so as to lock the filter;
   wherein the connection boss comprises two symmetrical side surfaces, the translation rod is a Y-shaped translating fork having two branches that are symmetrically arranged at two side surfaces of the connection boss, the two branches of the Y-shaped translating fork are each connected with a first spring, a handle portion of the Y-shaped translating fork is connected with a linkage mechanism provided at a top thereof with a recess with a gradually changing depth, and the handle portion of the Y-shaped translating fork is abutted against the recess, such that the Y-shaped translating fork is moved inward as the linkage mechanism is moved upward;
   wherein the linkage mechanism comprises a first link and a second link, a second spring is provided between the first link and the second link, a lower end of the second link is provided with a pressing lid for pressing, and an upper end of the first link is provided with the recess.

2. The household water purifier according to claim 1, wherein the snapping blocks comprises fixed blocks and movable blocks, the fixed blocks and the movable blocks are wedge-shaped blocks with a same width, upper surfaces of the fixed blocks and lower surfaces of the movable blocks are beveled surfaces, inclination angles of the beveled surfaces are not less than an inclination angle of a lower sloping surface of the recess, a displacement of the Y-shaped translation fork laterally moved by a push from the linkage mechanism is at least a width of one of the wedge-shaped blocks; when the first spring returns to an original position, a lower surface of each of the fixed blocks is abutted with an upper surface of a corresponding one of the movable blocks.

3. A household water purifier, comprising:
   a filter;
   a housing;
   a filter quick knockdown mechanism, comprising a first positioning mechanism, a second positioning mechanism and a locking mechanism, wherein the first positioning mechanism provided on the filter is configured to be mated with the second positioning mechanism provided on the housing of the household water purifier, when the first positioning mechanism and the second positioning mechanism are mated with each other, the filter is coupled with the housing via the locking mechanism;
   a lower end surface of the filter is movably connected with a pressing plate, and the pressing plate is configured to lift the filter and press a pressing lid of the filter quick knockdown mechanism upon disassembling the filter;
   wherein the locking mechanism comprises snapping blocks and a translation rod, the translation rod is configured to be slidably arranged on the housing, an upper end of the filter is provided with a connection boss for connecting a water flow pipeline, and the translation rod and the connection boss each are provided with the snapping blocks at equal intervals, when the connection boss is abutted against a bottom surface of an inner cavity of the housing, at least one of the snapping blocks which are arranged on the translation rod coupled with at least one of the snapping blocks which are arranged on the connection boss, so as to lock the filter;

wherein the connection boss comprises two symmetrical side surface, the translation rod is a Y-shaped translating fork, having two branches that are symmetrically arranged at two side surfaces of the connection boss, the two branches of the Y-shaped translating fork each are connected with a first spring, a handle portion of the Y-shaped translating fork is connected with a linkage mechanism provided at a top thereof with a recess with a gradually changing depth, and the handle portion of the Y-shaped translating fork is abutted against the recess, such that the Y-shaped translating fork is moved inward as the linkage mechanism is moved upward;

wherein the linkage mechanism comprises a first link and a second link, a second spring is provided between the first link and the second link, a lower end of the second link is provided with a pressing lid for pressing, and an upper end of the first link is provided with the recess.

4. The household water purifier according to claim 3, wherein the snapping blocks comprises fixed blocks and movable blocks, the fixed blocks and the movable blocks are wedge-shaped blocks with a same width, upper surfaces of the fixed blocks and lower surfaces of the movable blocks are beveled surfaces, inclination angles of the beveled surfaces are not less than an inclination angle of a lower sloping surface of the recess, a displacement of the Y-shaped translation fork laterally moved by a push from the linkage mechanism is at least a width of one of the wedge-shaped blocks; when the first spring returns to an original position, a lower surface of each of the fixed blocks is abutted with an upper surface of a corresponding one of the movable blocks.

5. The household water purifier according to claim 3, wherein the first positioning mechanism comprises a guide groove, the second positioning mechanism comprises a positioning protrusion mated with the guide groove, and the guide groove and the positioning protrusion are both parallel to an axis of the filter.

6. The household water purifier according to claim 3, wherein the first positioning mechanism comprises a positioning protrusion, the second positioning mechanism comprises a guide groove mated with the positioning protrusion, and the guide groove and the positioning protrusion are both parallel to an axis of the filter.

7. The household water purifier according to claim 3, wherein the lower end surface of the filter is provided with a U-shaped groove along a radial direction, a pair of sliding grooves is symmetrically provided at two sides of the U-shaped groove, a pair of cylindrical sliding blocks matching with the sliding grooves is symmetrically provided at two sides of a middle portion of the pressing plate, such that the pressing lid is flush with the lower end surface of the filter.

8. The household water purifier according to claim 3, wherein the connection boss of the filter is provided with a water inlet and a water outlet with a same shape, the water inlet and the water outlet are provided therein with a water-stop mechanism respectively, the water-stop mechanism is hermetically connected with a shell of the filter and the water flow pipeline; and a water outlet of the water flow pipeline is connected to a water quality monitor provided on a water faucet.

9. The household water purifier according to claim 8, wherein the water-stop mechanism comprises an elastic element and a rebound water-stop valve, the rebound water-stop valve comprises a water-inlet valve plate, a water-stop valve plate and a support rod, shapes of both the water-inlet valve plate and the water-stop valve plate are matched with a shape of the water inlet or a shape of the water outlet, the water-inlet valve plate is provided with a plurality of water passage holes, a bottom portion of the water inlet or a bottom portion of the water outlet is provided with an annular boss surface of which a center is provided with a water-inlet through hole, an upper end of the support rod is connected with a center portion of the water-inlet valve plate, a lower end of the support rod is connected with a center portion of the water-stop valve plate, the elastic element is a spring that is sleeved on the support rod and located between the water-inlet valve plate and the annular boss surface, a diameter of the water-inlet through hole is greater than a diameter of the support rod and less than a diameter of the water-stop valve plate, the water-stop valve plate is located below the annular boss surface, an upper end of the water inlet or an upper end of the water outlet as well as an upper surface of the water-stop valve plate are provided with sealing rings, the diameter of the water-stop valve plate is greater than an inner diameter of each of the sealing rings on the water inlet or the water outlet, and less than an inner diameter of the water inlet or an inner diameter of the water outlet.

* * * * *